United States Patent [19]
Walker

[11] Patent Number: 5,112,039
[45] Date of Patent: May 12, 1992

[54] ANNULAR ELASTOMERIC SLURRY SEAL

[75] Inventor: Craig I. Walker, Artarmon, Australia

[73] Assignee: Warman International Limited, New South Wales, Australia

[21] Appl. No.: 683,572

[22] Filed: Apr. 10, 1991

Related U.S. Application Data

[63] Continuation of Ser. No. 332,278, filed as PCT/AU88/00220, Jun. 29, 1988, abandoned.

[30] Foreign Application Priority Data

Jul. 8, 1987 [AU] Australia .................. PI-2977

[51] Int. Cl.⁵ .............................. F16J 15/38
[52] U.S. Cl. .................... 277/81 R; 277/85; 277/92
[58] Field of Search ............ 277/81 R, 85, 86, 87, 277/92, 177, 93 R, 93 SD

[56] References Cited

U.S. PATENT DOCUMENTS

| | | | |
|---|---|---|---|
| 2,445,062 | 3/1948 | Goldberg et al. | 277/92 X |
| 3,086,782 | 4/1963 | Peickii et al. | 277/92 |
| 3,184,247 | 5/1965 | Lentwyler | 277/170 |
| 3,403,916 | 10/1968 | Durham et al. | 277/92 |
| 3,606,358 | 9/1971 | Tobler | 277/170 |
| 3,749,412 | 7/1973 | Lingley | 277/81 R |
| 3,837,658 | 9/1974 | Skinner et al. | 277/85 X |
| 3,938,553 | 2/1976 | Ortega | 251/900 X |
| 4,346,685 | 8/1982 | Fujikawa | 277/170 |
| 4,544,049 | 10/1985 | Shellhause | 277/170 |
| 4,640,559 | 2/1987 | Crotti | 277/92 X |
| 4,669,735 | 6/1987 | Surdberg et al. | 277/85 |
| 4,691,927 | 9/1989 | Sudol et al. | 277/88 |

FOREIGN PATENT DOCUMENTS 102119  6/1961  Denmark ............... 277/170

Primary Examiner—Allan N. Shoap
Attorney, Agent, or Firm—Amster, Rothstein & Ebenstein

[57] ABSTRACT

A rotary mechanical seal for a rotating shaft passing into a pressure vessel, the seal having stationary and rotating seal rings (12) with at least one of the rings (12) supported in an axially biased holder (9), characterized by an elastomeric annular seal (11) held in a groove, which groove is so designed as to obviate clogging or crystallizing in the gap between the seal face holder (9) and the housing (10). the groove has a protrusion located on its outer edge which has sloped inner and outer faces to cooperate with the annular elastomeric seal (11) so that the seal protrudes past or is flush with the edge.

2 Claims, 5 Drawing Sheets

ANNULAR ELASTOMERIC SLURRY SEAL

This is a continuation of co-pending application Ser. No. 332,278 filed as PCT/AU88/00220, Jun. 29, 1988, now abandoned.

The present invention relates to a rotary mechanical seal for rotating shafts passing into a pressure vessel, and in particular, to such a seal for a slurry pump.

The conventional mechanical seal used to seal the rotating shaft of a product pump comprises a stationary seal ring connected to the pump housing and a rotatable seal ring connected to the impeller shaft, each seal ring having a lapped seal face opposing the seal face on the other ring. Resilient means such as coil springs and/or bellows urge one seal ring face towards the other in sealing relation.

Most mechanical seals of the type described above use an elastomeric annular member to seal the stationary seal face carrier within the housing, whilst still allowing the carrier to move in an axial direction and transmit the spring force to urge one face against the other.

This elastomeric annular member is held within a groove in the housing, with typically close clearances on both sides of the groove, between the seal face carrier and the housing. This close clearance is designed to provide backing to the elastomer to prevent extrusion under pressure and to hold the annular member in position during assembly and adjustment.

In applications where the product fluid does not contain solids, then the above arrangement does not normally present a problem. However, in slurry pumps where particulate solids are present or the mixture has a tendency to crystallise, the close clearance on the product side is likely to get clogged and the seal will not function properly.

Prior art seals rely on an elastomeric annular member in a fully surrounded close clearance groove to keep the pumped product from leaking, whilst providing the resilience in the axial direction to ensure the spring force is transmitted to the stationary face.

Shown in FIG. 1 is a typical mechanical seal. This utilises a coil spring 1 to urge the stationary sealing ring face 2 toward the rotating sealing ring 3. An elastomeric annular member 4 (in this case an O-ring) provides the seal between the axially adjustable stationary holder 5 and the seal housing 6. This mechanical seal is susceptible to failure because of clogging of particles in the small gap 7.

The present invention seeks to ameliorate this disadvantage by providing an elastomeric annular member of suitable size, and a groove of appropriate design so as to obviate clogging or crystalising in the gap between the seal face holder and the housing.

The invention will now be described by way of example with reference to the following drawings in which.

Figure 1:
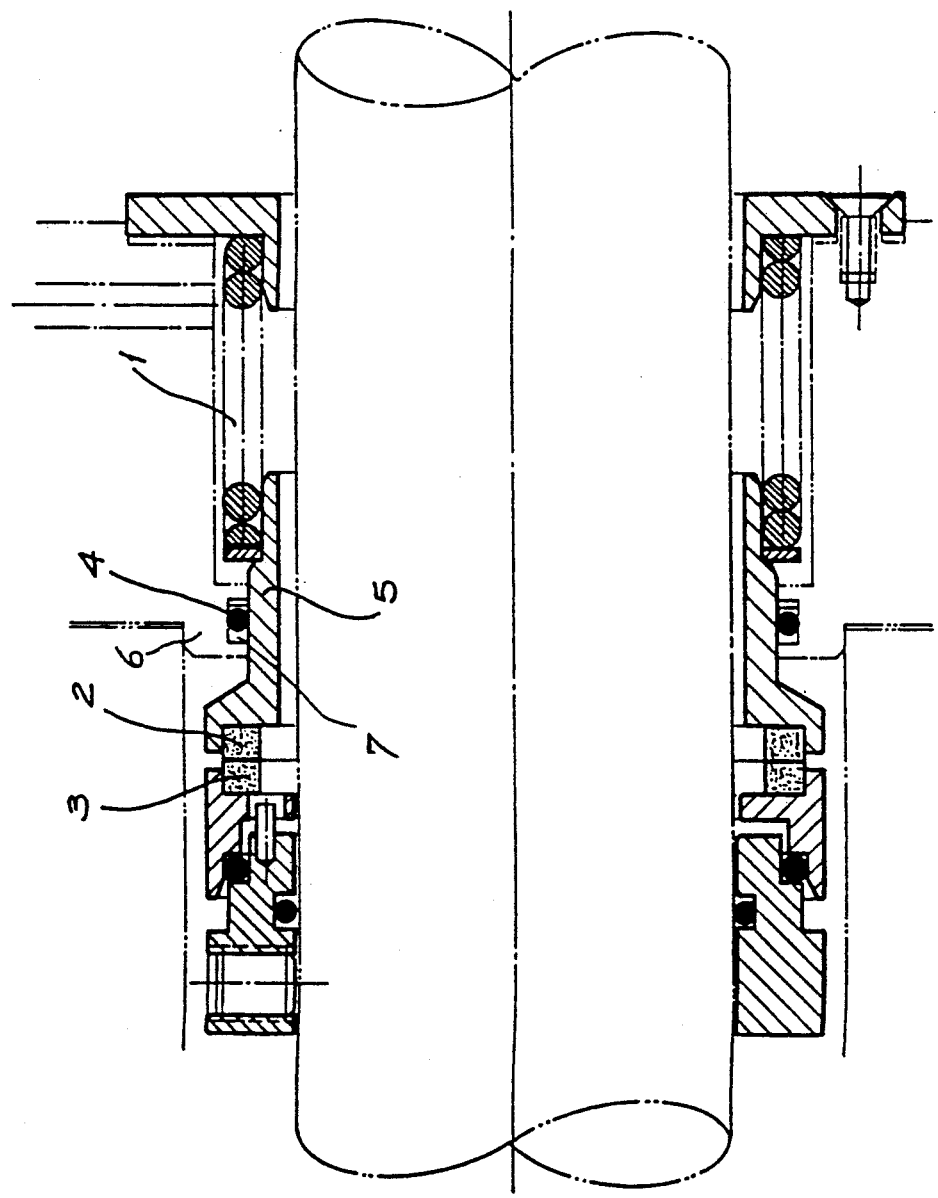
FIG. 1 is a sectional view of a prior art mechanical seal.
Figure 2:
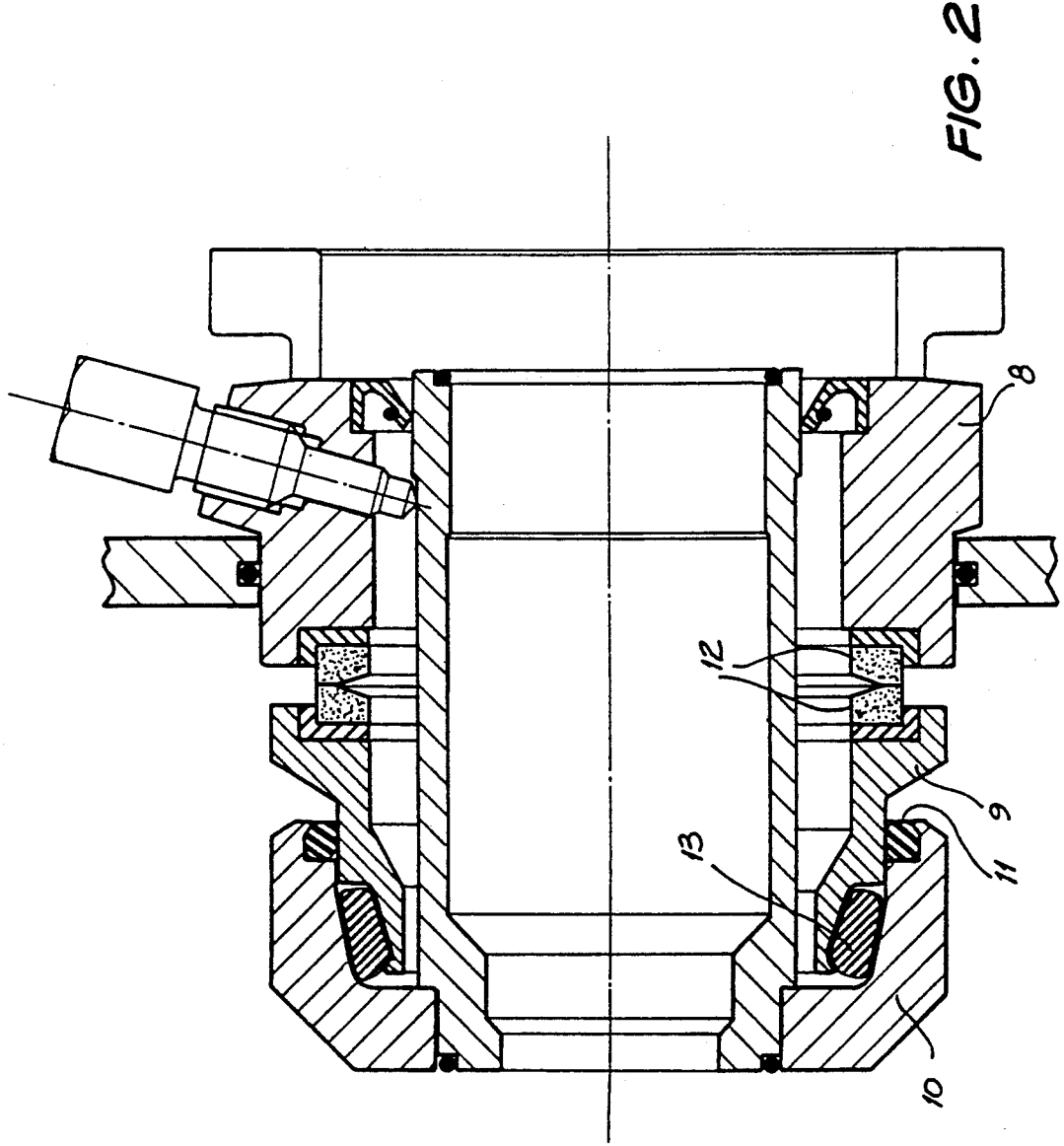
FIG. 2 is a sectional view of one embodiment of the present invention in which only one annular sealing element is utilised.

As shown in FIG. 2 the stationary housing 8 projects into the pump casing and contains seal face 12. The rotating seal face carrier 9 is spring urged by an elastomeric member in compression 13. The rotating seal holder 10 contains the groove of the present invention and the elastomeric annular member 11.

Figure 3:
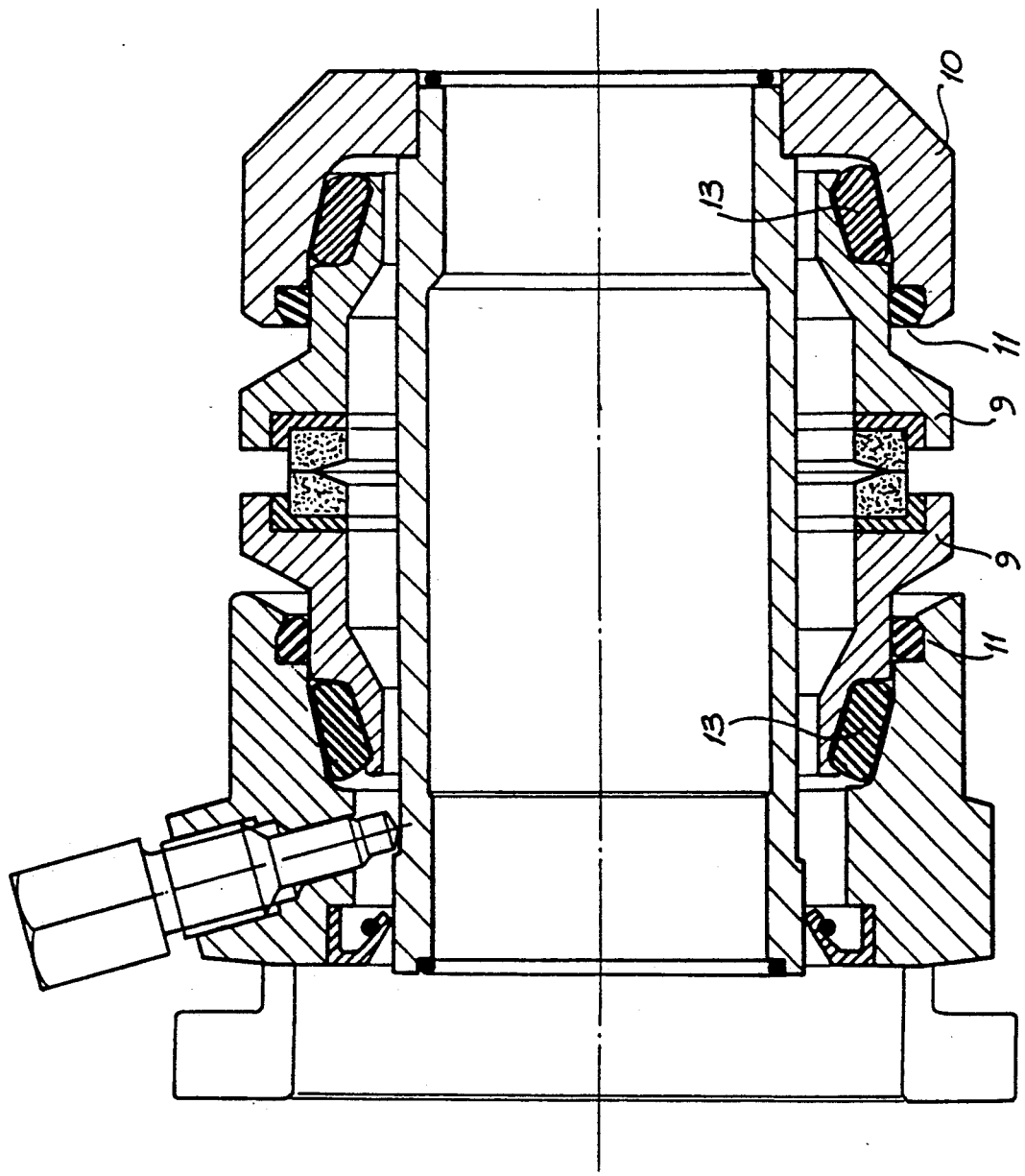
FIG. 3 is a sectional view of a second embodiment utilising a duality of annular sealing elements where both stationary and rotating elements are spring urged towards each other.

FIG. 3 shows two seal face carriers 9, both resiliently mounted in the annular elastomeric member 11, and spring urged by elastomeric member 13.

Figure 4:
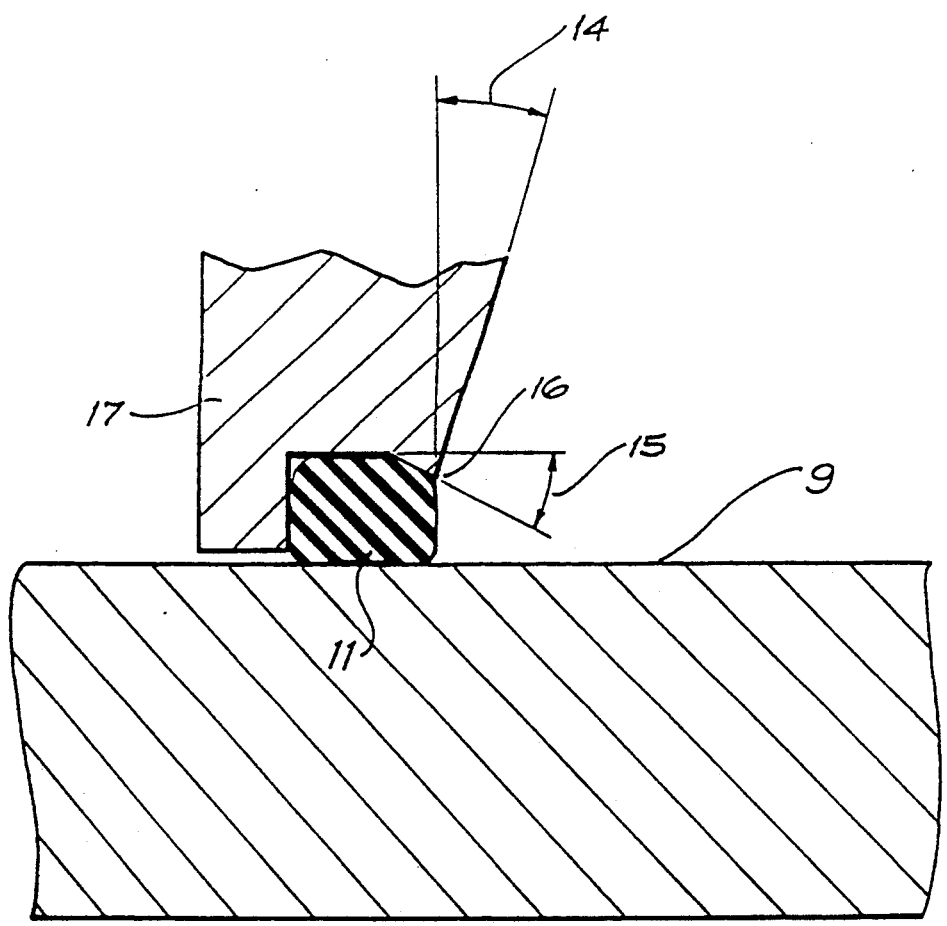
FIG. 4 is a fragmentary sectional view thereof, to an enlarged scale, showing the relative size and shape of the groove and the elastomeric annular member.
Figure 5:
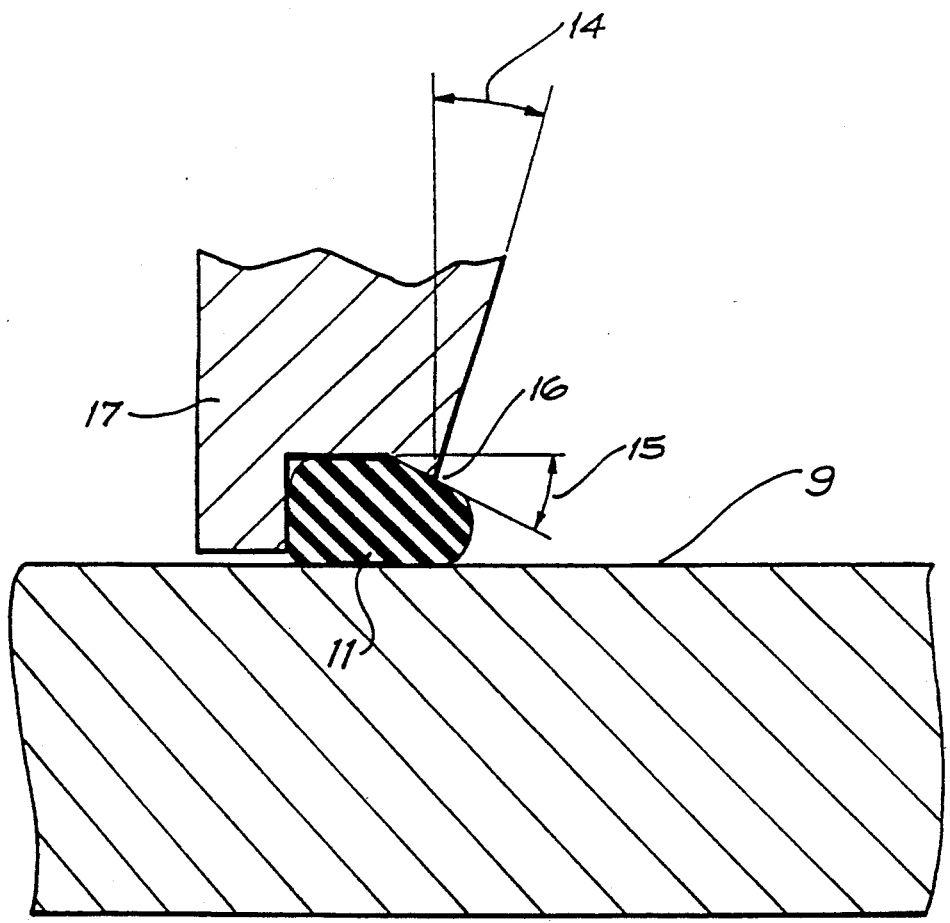
FIG. 5 is a fragmentary sectional view thereof, to an enlarged scale, showing a different relative size and shape of the groove and the elastomeric annular member.

FIG. 4 shows details of the groove of one embodiment of the present invention. Angle 14 is shallow, preferably less than 45 degrees to avoid hang-up of material or bridging across the gap between point 16 and the seal face holder or carrier 17. Angle 15 is shallow, preferably less than 45 degrees, and designed to provide retention of the elastomeric member during installation and adjustment. The cross-sectional area of the groove is such that the annular elastomeric member 11 should protrude beyond (as shown in FIG. 5) or be equal in protrustion to (as shown in FIG. 4) the point 16 of the seal housing 17. The point 16 should be no less in height than half the overall groove height to ensure maximum resilience of the elastomer in transmiting the spring forces.

FEATURES

The features of annular elastomeric sealing elements of preferred embodiments of the present invention are:

1. The elastomeric face of the element is exposed to the slurry providing a resilient sealing surface, which will prevent the deposition or crystallisation of slurry particles.

2. With no extended lip on the sealing element's groove, and the elastomeric material protruding or flush with the edge of the housing, there is no possibility of material collecting between the housing and the seal face carrier (even if the housing is rotating), and thus no possibility for the gap to become clogged.

3. With the sealing element groove of the present invention, the cross-sectional shape of the elastomeric member is not critical, and standard O-ring or rectangular sections may be adopted.

The major benefit of the above features is to allow the seal carrier to remain axially free within the housing and to transmit the spring force to the faces. This is not possible in slurries with prior art designs.

It should be obvious to people skilled in the art that alterations and modifications to the above described seal without departing from the spirit or scope of the present invention.

I claim:

1. In a rotary mechanical seal for a rotating axially extending shaft passing into a pressure vessel containing slurries of abrasive particles, said seal comprising
   a seal housing having a circular groove bounded by a generally radially extending side wall, a generally axially extending floor contiguous to said side wall, a a generally axially and radially extending open face defining a protrusion opposite said side wall, and a generally axially extending open face radially opposite said floor and facing radially inwardly; and an elastomeric annular member located in said groove and extending radially inwardly to bear on a seal face holder in a sealing manner;

the improvement comprising said protrusion being located facing a high pressure area of the pressure vessel, said protrusion extending from said groove floor towards said seal face holder;

said protrusion having an edge formed by a surface facing the groove, which forms an angle to said groove floor of less than 45°, and a surface facing externally of the groove, which forms an angle to a plane normal to said groove floor of less than 45°; and said elastomeric annular member in use being configured and dimensioned to extend lengthwise along said groove abutting and sealing against the inner surface of said protrusion and to extend at least to said protrusion edge, thereby preventing crystallization and clogging around said elastomeric annular member.

2. In a rotary axially extending mechanical seal for a rotating shaft passing into a pressure vessel containing slurries of abrasive particles, said seal comprising a seal housing having a circular groove bounded by a generally radially extending side wall, a generally axially extending floor contiguous to said side wall, a a generally axially and radially extending open face defining a protrusion opposite said side wall, a generally axially extending open face radially opposite said floor and facing radially inwardly; and an elastomeric annular member located in said groove and extending radially inwardly to bear on a seal face holder in a sealing manner;

the improvement comprising said protrusion being located facing a high pressure area of the pressure vessel, said protrusion extending from said groove floor towards said seal face holder a distance less than the height of said groove between said groove floor and groove open face, but not less than half the height of said groove;

said protrusion having an edge formed by a surface facing the groove, which forms an angle to said groove floor of less than 45°, and a surface facing externally of the groove, which forms an angle to a plane normal to said groove floor of less than 45°; and said elastomeric annular member in use being configured and dimensioned to extend lengthwise along said groove abutting and sealing against the inner surface of said protrusion and to extend at least to said protrusion edge.

* * * * *